US009443510B2

United States Patent
Jung

(10) Patent No.: US 9,443,510 B2
(45) Date of Patent: Sep. 13, 2016

(54) SPEECH RECOGNITION APPARATUS AND METHOD

(71) Applicant: LG ELECTRONICS INC., Seoul (KR)

(72) Inventor: Dukyung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/411,627

(22) PCT Filed: Jul. 5, 2013

(86) PCT No.: PCT/KR2013/005984
§ 371 (c)(1),
(2) Date: Dec. 29, 2014

(87) PCT Pub. No.: WO2014/010879
PCT Pub. Date: Jan. 16, 2014

(65) Prior Publication Data
US 2015/0161992 A1    Jun. 11, 2015

Related U.S. Application Data

(60) Provisional application No. 61/669,501, filed on Jul. 9, 2012.

(51) Int. Cl.
*G10L 15/24* (2013.01)
*G10L 15/08* (2006.01)
(Continued)

(52) U.S. Cl.
CPC ............. *G10L 15/083* (2013.01); *G10L 15/20* (2013.01); *G10L 15/25* (2013.01); *G10L 2015/227* (2013.01)

(58) Field of Classification Search
CPC ................................ G10L 15/24; G10L 15/25
See application file for complete search history.

(56) References Cited

U.S. PATENT DOCUMENTS 5,918,222 A * 6/1999 Fukui ...................... G06Q 10/10
6,975,983 B1 * 12/2005 Fortescue ............... G06F 3/038
704/257

(Continued)

FOREIGN PATENT DOCUMENTS

| CN | 101308653 | 11/2008 |
|----|-----------|---------|
| EP | 0594129 A2 | 10/1993 |

(Continued)

OTHER PUBLICATIONS

Extended European Search Report issued in European Application No. 13817278.8 on Feb. 3, 2016, 11 pages.

(Continued)

*Primary Examiner* — Brian Albertalli
(74) *Attorney, Agent, or Firm* — Fish & Richardson P.C.

(57) ABSTRACT

The present specification relates to a speech recognition apparatus and method capable of accurately recognizing the speech of a user in an easy and convenient manner without the user having to operate a speech recognition start button or the like. The speech recognition apparatus according to embodiments of the present specification comprises: a camera for capturing a user image; a microphone; a control unit for detecting a preset user gesture from the user image, and, if a nonlexical word is detected from the speech signal which is input through the microphone from the point in time at which the user gesture was detected, determining the speech signal detected after the detected nonlexical word as an effective speech signal; and a speech recognition unit for recognizing the effective speech signal.

18 Claims, 9 Drawing Sheets

(51) Int. Cl.
  *G10L 15/20* (2006.01)
  *G10L 15/25* (2013.01)
  *G10L 15/22* (2006.01)

(56) References Cited

U.S. PATENT DOCUMENTS

| | | | | |
|---|---|---|---|---|
| 6,985,863 | B2* | 1/2006 | Itoh | G10L 15/187 704/251 |
| 8,160,311 | B1* | 4/2012 | Schaefer | G06F 3/011 345/157 |
| 2002/0007275 | A1* | 1/2002 | Goto | G10L 15/1822 704/251 |
| 2002/0035475 | A1 | 3/2002 | Yoda | |
| 2002/0105575 | A1* | 8/2002 | Hinde | G10L 15/24 348/14.01 |
| 2003/0001908 | A1 | 1/2003 | Cohen-Solal | |
| 2003/0040914 | A1* | 2/2003 | Friedrich | G06F 3/013 704/275 |
| 2003/0171932 | A1* | 9/2003 | Juang | G10L 15/24 704/276 |
| 2004/0181410 | A1* | 9/2004 | Hwang | G10L 15/142 704/256 |
| 2004/0216049 | A1* | 10/2004 | Lewis | G06F 3/167 715/247 |
| 2006/0192775 | A1* | 8/2006 | Nicholson | A61F 4/00 345/211 |
| 2006/0200350 | A1* | 9/2006 | Attwater | G10L 15/08 704/251 |
| 2008/0167868 | A1* | 7/2008 | Kanevsky | G10L 15/20 704/233 |
| 2008/0228496 | A1* | 9/2008 | Yu | G06F 3/038 704/275 |
| 2009/0164219 | A1* | 6/2009 | Yeung | G04C 3/002 704/258 |
| 2010/0121645 | A1* | 5/2010 | Seitz | B60K 35/00 704/275 |
| 2011/0184736 | A1* | 7/2011 | Slotznick | G10L 15/1815 704/249 |
| 2011/0208521 | A1 | 8/2011 | McClain | |
| 2012/0259638 | A1* | 10/2012 | Kalinli | G10L 15/25 704/270 |
| 2012/0278074 | A1* | 11/2012 | Burke | G06F 3/0346 704/235 |
| 2012/0295708 | A1* | 11/2012 | Hernandez-Abrego | G06F 3/013 463/36 |
| 2012/0304067 | A1* | 11/2012 | Han | G06F 3/167 715/728 |
| 2013/0021459 | A1* | 1/2013 | Vasilieff | G10L 25/78 348/77 |
| 2013/0144629 | A1* | 6/2013 | Johnston | G06F 3/167 704/275 |
| 2013/0304479 | A1* | 11/2013 | Teller | G06F 3/013 704/275 |
| 2013/0325474 | A1* | 12/2013 | Levien | G10L 15/065 704/251 |

FOREIGN PATENT DOCUMENTS

| | | |
|---|---|---|
| JP | 1995-306772 A | 11/1995 |
| KR | 10-2001-0075838 A | 11/2001 |

OTHER PUBLICATIONS

Kitayama et al., "Speech Starter: Noise-Robust Endpoint Detection by Using Filled Pauses," EUROSPEECH 2003, Sep. 2003, pp. 1237-1240.

Ogata et al., "The Use of Acoustically Detected Filled and Silent Pauses in Spontaneous Speech Recognition," ICASSP 2009, pp. 4305-4308.

Oh et al., "Evaluating Look-to-Talk: A Gaze-Aware Interface in a Collaborative Environment," CHI 2002, Apr. 2002, pp. 650-651.

Office Action issued in Chinese Application No. 201380036950.3 on Jul. 15, 2016, 12 pages (with English translation).

\* cited by examiner

SPEECH RECOGNITION APPARATUS AND METHOD

CROSS-REFERENCE TO RELATED APPLICATION

This application is the National Stage of International Application No. PCT/KR2013/005984, filed Jul. 5, 2013, which claims the benefit under 35 U.S.C. §119(e) of U.S. Provisional Application 61/669,501 filed on Jul. 9, 2012, the contents of both of which are hereby incorporated by reference in their entirety.

TECHNICAL FIELD

The present disclosure relates to a speech recognition apparatus and method.

BACKGROUND ART

In general, speech recognition is a series of processes of extracting phonemes, i.e., linguistic information from acoustic information included in speech, and allowing a machine to recognize the extracted information and respond to the recognized information. Conversation in speech is recognized as the most natural and simple method among information exchange media between a large number of human and machines, but there is a restriction that speech of a human should be transformed into codes that a machine can process in order to converse with the machine in speech. The process of transforming the speech of the human into the codes is the very speech recognition.

DISCLOSURE OF THE INVENTION

Therefore, an object of the present disclosure is to provide a speech recognition apparatus and method capable of accurately recognizing the speech of a user in an easy and convenient manner without the user having to operate a speech recognition start button or the like.

To achieve these and other advantages and in accordance with the purpose of the present disclosure, as embodied and broadly described herein, there is provided a speech recognition apparatus, including: a camera configured to capture a user image; a microphone; a control unit configured to detect a preset user gesture from the user image, and, if a nonlexical word is detected from the speech signal input through the microphone from the point in time at which the user gesture was detected, determine, as an effective speech signal, the speech signal following the detected nonlexical word; and a speech recognition unit configured to recognize the effective speech signal.

The control unit may track the eyes of a user in real time through the camera, and, if the nonlexical word is detected in the speech signal input through the microphone from the point of time at which the tracked eyes of the user are directed toward the microphone, determine, as the effective speech signal, the speech signal following the detected nonlexical word.

The nonlexical word may be an interjection.

The control unit may operate the speech recognition unit when the eyes of the user are directed toward the microphone.

If the eyes of the user are directed to the microphone, and the nonlexical word is not detected from the speech signal input through the microphone, the control unit may turn off the speech recognition unit.

The camera and the microphone may be installed at positions equal or similar to each other.

The control unit may track the eyes of the user through the camera, and, if a preset shape of the mouth of the user is detected from the user image input from the point of time at which the tracked eyes of the user are directed toward the microphone, determine, as the effective speech signal, the speech signal input from the point of time at which the preset shape of the mouth of the user is detected.

The preset shape of the mouth of the user may be a shape in which the mouth of the user moves or a shape in which the mouth of the user is opened.

The control unit may track the eyes of the user through the camera, and, if a preset shape of the mouth of the user is detected from the user image input from the point of time at which the tracked eyes of the user are directed toward the microphone, determine, as a speech section for speech recognition, only the speech signal corresponding to the preset shape of the mouth of the user in the speech signal input from the point of time at which the preset shape of the mouth of the user is detected.

The control unit may determine, as a non-speech section, the other speech signal except the speech signal corresponding to the preset shape of the mouth of the user in the speech signal input from the point of time at which the preset shape of the mouth of the user is detected.

To achieve these and other advantages and in accordance with the purpose of the present disclosure, as embodied and broadly described herein, there is provided a speech recognition method, including: detecting a preset user gesture from a user image captured by a camera; determining, if a nonlexical word is detected from a speech signal input through a microphone from the point of time at which the user gesture is detected, the speech signal following the detected nonlexical word as an effective speech signal; and recognizing the effective speech signal through a speech recognition unit.

In the speech recognition apparatus and method according to embodiments of the present disclosure, if a nonlexical word (e.g., an interjection) is detected from a speech signal input from the point of time at which the eyes of the driver (user) are directed toward the microphone, the speech signal following the detected nonlexical word is automatically recognized as an effective speech signal, so that the driver (user) getting on the vehicle can accurately recognize the speech of the user in an easy and convenient manner without operating the speech recognition start button.

In the speech recognition apparatus and method according to embodiments of the present disclosure, if a preset shape of the mouth of the user (e.g., an image in which the mouth of the user moves or an image in which the mouth of the user is opened) is detected from the user image input from the point of time at which the user directs toward the microphone, the speech signal input from the point of time at which the preset shape of the mouth of the user is detected is automatically recognized as an effective speech signal, so that the driver (user) getting on the vehicle can accurately recognize the speech of the user in an easy and convenient manner without operating the speech recognition start button.

In the speech recognition apparatus and method according to embodiments of the present disclosure, if a preset shape of the mouth of the user (e.g., an image in which the mouth of the user moves) is detected from the user image input from the point of time at which the user directs toward the microphone, only a speech signal corresponding to the preset shape of the mouth of the user (e.g., the image in which the mouth of the user moves) in the speech signal input from the point of time at which the preset shape of the mouth of the user is detected is recognized as an effective speech signal, so that the user speech can be accurately recognized regardless of noises with the vehicle (e.g., noises of a wiper, sounds of a turn-signal light, sounds of a vehicle engine, etc.).

BEST MODES FOR CARRYING OUT THE PREFERRED EMBODIMENTS

Figure 1:
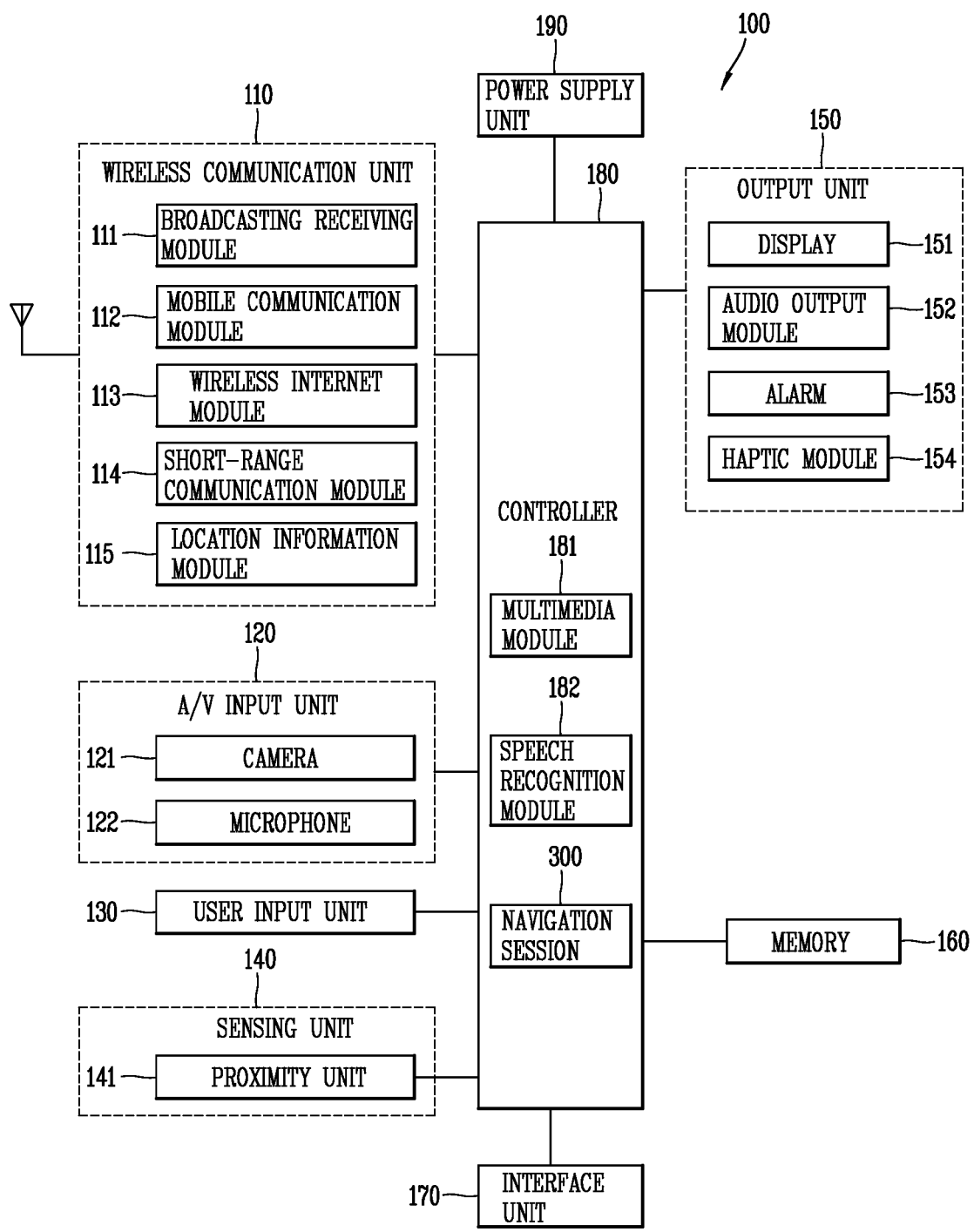
FIG. 1 is a block diagram showing a configuration of a mobile communication terminal for illustrating embodiments of the present disclosure.

It is noted that technical terms used in the specification are used to just describe a specific embodiment and do not intend to limit the present disclosure. Further, if the technical terms used in the specification are not particularly defined as other meanings in the specification, the technical terms should be appreciated as meanings generally appreciated by those skilled in the art and should not be appreciated as excessively comprehensive meanings or excessively reduced meanings. Further, when the technical term used in the specification is a wrong technical term that cannot accurately express the spirit of the present disclosure, the technical term is substituted by a technical term which can correctly appreciated by those skilled in the art to be appreciated. In addition, a general term used in the present disclosure should be analyzed as defined in a dictionary or according to front and back contexts and should not be analyzed as an excessively reduced meaning.

Moreover, if singular expression used in the specification is not apparently different on a context, the singular expression includes a plural expression. Further, in the present disclosure, it should not analyzed that a term such as "comprising" or "including" particularly includes various components or various steps disclosed in the specification and some component or some steps among them may not included or additional components or steps may be further included.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure. Similarly, the second component may be named as the first component. In addition, the term "and/or" refers to the combination of components having the meaning of the plural number or one of the components.

Hereinafter, exemplary embodiments of the disclosure will be described in more detail with reference to accompanying drawings. In the following description, the same reference numerals will be assigned to the same components for the obvious comprehension of the embodiment, and the same components will not be repeatedly described in order to avoid redundancy.

In describing the present disclosure, when it is determined that the detailed description of the known art related to the present disclosure may obscure the gist of the present disclosure, the detailed description thereof will be omitted. Further, it is noted that the accompanying drawings are used just for easily appreciating the spirit of the present disclosure and it should not be analyzed that the spirit of the present disclosure is limited by the accompanying drawings.

FIG. 1 is a block diagram showing a configuration of a mobile communication terminal 100 for illustrating embodiments of the present disclosure. The mobile communication terminal (mobile phone) 100 may be implemented in various forms. Examples of the mobile communication terminal 100 are a smart phone, a notebook computer, a terminal for digital broadcasting, a personal digital assistants (PDA), a portable multimedia player (PMP), and the like.

As shown in FIG. 1, the mobile communication terminal 100 may include a wireless communication unit 110, an audio/video (A/V) input unit 120, a user input unit 130, a sensing unit 140, an output unit 150, a memory 160, an interface unit 170, a control unit 180, a power supply unit 190, and the like. All components of the mobile communication terminal shown in FIG. 1 are not essential components. The mobile communication terminal 100 may be implemented by components of which number is more than that of the components shown in FIG. 1, or may be implemented by components of which number is less than that of the components shown in FIG. 1.

The wireless communication unit 110 may include one or more components for performing wireless communication between the mobile communication terminal 100 and a wireless communication system or wireless communication between the mobile communication terminal 100 and a network in which the mobile communication terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server may mean a server which generates and transmits a broadcast signal and/or broadcast associated information or a server which is provided with a previously generated broadcast signal and/or broadcast associated information and then transmits the provided signal or information to the mobile communication terminal 100. The broadcast associated information may mean information associated with a broadcast channel, a broadcast program or a broadcast service provider. The broadcast signal may include a TV broadcast signal, a radio broadcast signal, and a data broadcast signal. The broadcast signal may further include a broadcast signal combined with a TV or radio broadcast signal.

Meanwhile, the broadcast associated information may be provided via a mobile communication network. In this case, the broadcast associated information may be received by the mobile communication module 112. The broadcast associated information may be implemented in various forms. For example, the broadcast associated information may be implemented in the form of an electronic program guide (EPG) of digital multimedia broadcasting (DMB), an electronic service guide (ESG) of digital video broadcast-handheld (DVB-H), or the like.

The broadcast receiving module 111 receives digital broadcast signals using various types of digital broadcast systems. Particularly, the broadcast receiving module 111 may receive digital broadcast signals using digital broadcasting systems including digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is configured suitable for not only the digital broadcasting systems described above but also all broadcasting systems that provide broadcasting signals. The broadcast signal and/or broadcast associated information received by the broadcast receiving module 111 may be stored in the memory 160.

The mobile communication module 112 transmits/receives wireless signals to/from at least one of a base station, an external terminal and a server on a mobile communication network. Here, the wireless signals may include a voice call signal, a video telephony call signal or various forms of data according to text/multimedia message transmission/reception.

The wireless Internet module 113 means a module for supporting wireless Internet access. The wireless Internet module 113 may be built-in or externally installed to the mobile communication terminal 100. Here, it may be used a wireless Internet access technology including wireless LAN (WLAN), Wi-Fi, wireless broadband (WiBro), world interoperability for microwave access (WiMax), high speed downlink packet access (HSDPA), and the like.

The short-range communication module 114 means a module for supporting short-range communications. Here, it may be used a short-range communication technology including Bluetooth, radio frequency identification (RFID), infrared data association (IrDA), ultra wideband (UWB), ZigBee, and the like.

The location information module 115 is a module for checking or acquiring a location of the mobile communication terminal (a location of a vehicle when the mobile communication terminal is mounted in the vehicle). A global positioning system (GPS) module is an example. The GPS module receives location information from a plurality of satellites. Here, the location information may include coordinate information represented by latitude and longitude values. For example, the GPS module may measure an accurate time and distance from three or more satellites, and accurately calculate a current location according to trigonometry based upon three different distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. For the location information module 115, a Wi-Fi positioning system and/or a hybrid positioning system may be applicable thereto.

The A/V input unit 120 is configured to input an audio or video signal. The A/V input unit 120 may include a camera 121, a microphone 122, and the like. The camera 121 processes an image frame, such as still picture or video, obtained by an image sensor in a video phone call or image capturing mode. The processed image frame may be displayed on a display unit 151.

The image frames processed by the camera 121 may be stored in the memory 160 or be transmitted to the exterior through the wireless communication unit 110. Two or more cameras may be provided according to the configuration type of the mobile communication terminal.

The microphone 122 receives an external audio signal through a microphone in a phone call mode, a recording mode, a voice recognition mode, and the like, and processes the audio signal into electrical voice data. The processed voice data may be converted and outputted into a format capable of being transmitted to a mobile communication base station through the mobile communication module 112 in the phone call mode. The microphone 122 may implement various types of noise canceling algorithms to cancel noise generated in a procedure of receiving the external audio signal.

The user input unit 130 generates input data for allowing a user to control an operation of the mobile communication terminal. The user input unit 130 may be configured with a keypad, a dome switch, a touch pad (pressure/capacitance), a jog wheel, a jog switch, and the like. Particularly, when the touch pad forms an interlayer structure together with the display unit 151, this may be called as a touch screen.

The sensing unit 140 detects a current status of the mobile communication terminal 100 such as an opened or closed state of the mobile communication terminal 100, a location of the mobile communication terminal 100, the presence or absence of user contact, an orientation of the mobile communication terminal 100, and an acceleration/deceleration movement of the mobile communication terminal 100, and generates a sensing signal for controlling the operation of the mobile communication terminal 100. For example, when the mobile communication terminal 100 is of a slide phone type, the mobile communication terminal 100 may sense an opened or closed state of the slide phone. The sensing unit 140 also takes charge of a sensing function associated with whether power is supplied from the power supply unit 190, whether an external device is coupled with the interface unit 170, etc.

The interface unit 170 performs a role of interfacing with all external devices connected to the mobile communication terminal 100. The interface unit 170 may include, for example, wired/wireless headset ports, external charger ports, wired/wireless data ports, memory card ports, ports for coupling devices having an identification module, audio input/output (I/O) ports, video I/O ports, earphone ports, and the like. Here, the identification module may be configured as a chip for storing various information required to authenticate an authority for using the mobile communication terminal 100, which may include a user identity module (UIM), a subscriber identity module (SIM), a universal subscriber identity module (USIM), and the like. Also, the device provided with the identification module (hereinafter, referred to as 'identification device') may be implemented in the type of a smart card. Thus, the identification device can be coupled to the mobile communication terminal 100 via a port. The interface unit 170 may receive data or power from an external device and transfer the received data or power to each component in the mobile communication terminal 100, or transmit data within the mobile communication terminal 100 to the external device.

The output unit 150 is configured to provide an output for audio signal, video signal, or alarm signal. The output unit 150 may include the display unit 151, an audio output module 152, an alarm unit 153, and the like.

The display unit 151 may display or output information processed in the mobile communication terminal 100. For example, when the mobile communication terminal 100 is in a phone call mode, the display unit 151 may display a user interface (UI) or a graphic user interface (GUI) associated with a call. When the mobile communication terminal 100 is in a video call mode or image capturing mode, the display unit 151 may display a captured image and/or received image, a UI or GUI.

The display unit 151 may include at least one of a liquid crystal display (LCD), a thin film transistor-LCD (TFT-LCD), an organic light-emitting diode (OLED) display, a flexible display, and a three-dimensional (3D) display. Furthermore, there may exist two or more display units 151 according to an implementation form of the mobile communication terminal 100. For example, an external display unit (not shown) and an internal display unit (not shown) may be simultaneously provided in the mobile communication terminal 100.

When the display unit 151 and a sensor for detecting a touch operation (hereinafter, referred to as 'touch sensor') are formed with an interlayer structure (hereinafter, referred to as 'touch screen'), the display unit 151 may also be used as an input device in addition to an output device. The touch sensor may be configured in the form of, for example, a touch film, a touch sheet, a touch pad, or the like.

Furthermore, the touch sensor may be configured to convert a change such as pressure applied to a specific area of the display unit 151 or capacitance generated on a specific area of the display unit 151 into an electrical input signal. The touch sensor may be configured to detect a touch input pressure as well as a touch input position and a touch input area. When there is a touch input to the touch sensor, a signal (or signals) corresponding to the touch input is sent to a touch control unit (not shown). The touch control unit processes the signal (or signals) and then sends corresponding data to the control unit 180. Accordingly, the control unit 180 can know which region is touched on the display unit 151.

A proximity sensor 141 may be arranged in an inner region of the mobile terminal 100 surrounded by a touch screen or may be arranged adjacent to the touch screen. The proximity sensor 141 refers to a sensor for detecting the presence or absence of an object approaching to a certain detection surface or an object that exists nearby by using the force of electromagnetism or infrared rays without a mechanical contact. Thus, the proximity sensor 141 has a considerably longer life span as compared with a contact type sensor, and can be utilized for various purposes.

Examples of the proximity sensor 141 may include a transmission type photo sensor, a direct reflection type photo sensor, a mirror-reflection type photo sensor, an RF oscillation type proximity sensor, a capacitance type proximity sensor, a magnetic proximity sensor, an infrared proximity sensor, and the like. When the touch screen is of an electrostatic type, the approach of a pointer can be detected based on a change in a field according to the approach of the pointer. In this case, the touch screen (touch sensor) may be classified as a proximity sensor.

In the following description, for convenience of illustration, recognition of the pointer positioned to be close to the touch screen, although the pointer is not actually brought into contact with the touch screen, will be called as a "proximity touch", while recognition of actual contacting of the pointer on the touch screen will be called as a "contact touch". The position where the pointer is proximately touched on the touch screen means a position where the pointer is positioned to correspond vertically to the touch screen when the pointer is proximately touched.

Furthermore, the proximity sensor 141 senses a proximity touch, and a proximity touch pattern (for example, a proximity touch distance, a proximity touch direction, a proximity touch speed, a proximity touch time, a proximity touch position, a proximity touch movement state, or the like). Information corresponding to the sensed proximity touch operation and the proximity touch pattern can be outputted to the touch screen.

The audio output module 152 outputs audio data received from the wireless communication unit 110 or stored in the memory 160 in a call signal reception mode, a call mode, a record mode, a voice recognition mode, a broadcast reception mode, and the like. Also, the audio output module 152 outputs an audio signal associated with the function performed by the mobile communication terminal 100 (for example, a call signal reception sound, a message reception sound, etc.). The audio output module 152 may include a speaker, a buzzer, and the like.

The alarm unit 153 may output a signal to notify the occurrence of an event of the mobile communication terminal 100. Examples of the event occurred in the mobile communication terminal 100 may include call signal reception, message reception, a key signal input, and the like. In addition to an audio or video signal, the alarm unit 153 may output a signal in a different manner to notify the occurrence of an event. For example, the alarm unit 153 may output in a form of vibration. When a call signal or message is received, the alarm unit 153 may vibrate the mobile communication terminal 100 through vibration means in order to notify the reception of the call signal or message. When a key signal is inputted, the alarm unit 153 may vibrate the mobile communication terminal 100 through vibration means using a feedback to the key signal input. The user can recognize an occurrence of the event through vibration as described above. The signal for notifying an occurrence of the event may be outputted through the display unit 151 or the audio output module 152.

The haptic module 154 generates various tactile effects felt by the user. A typical example of the tactile effects generated by the haptic module 154 is vibration. The intensity, pattern, or the like of vibration generated by the haptic module 154 can be controlled. For example, different vibrations may be combined and outputted or sequentially outputted.

The haptic module 154, in addition to vibration, may generate various tactile effects, including an effect by stimulation such as a pin arrangement vertically moving against the contacted skin surface, an ejection or suction force of air through the ejection or suction port, a brush against the skin surface, a contact of the electrode, electrostatic force, or the like, or an effect by reproduction of thermal sense using a heat absorption or generation device.

The haptic module 154 may be implemented to feel a tactile effect through muscular senses by a finger or arm of the user as well as to transfer a tactile effect through direct contact. There may exist two or more haptic modules 154 according to the configuration aspect of a telematics terminal. The haptic module 154 may be provided at a place frequently being contacted by the user in a vehicle. For example, the haptic module 154 may be provided on a steering wheel, a gearshift lever, a seat, or the like.

The memory 160 may store programs for processing and controlling the control unit 180, or may temporarily store data (e.g., map data, phonebook, message, still image, video, and the like) that are inputted and/or outputted.

The memory 160 may include at least one type of storage medium including a flash memory type, a hard disk type, a multimedia card micro type, a card-type memory (e.g., SD or DX memory, etc), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. Also, the mobile communication terminal 100 may run a web storage that performs the storage function of the memory 160 over the Internet, or operate in association with the web storage.

The interface unit 170 serves as an interface to every external device that may be connected with the mobile communication terminal 100. For example, the interface unit 170 may include a wired or wireless headset port, an external battery charger port, a wired or wireless data port, a memory card port, a ports for connecting a device having an identification module, an audio input/output (I/O) port, a video input/output (I/O) port, an earphone port, and the like. Here, the identification module, as a chip that stores various information for authenticating the authority to use the mobile terminal 100, may include a user identity module (UIM), a subscriber identity module (SIM), a universal subscriber identity module (USIM), and the like. In addition, the device having the identification module (hereinafter, referred to as 'identifying device') may be made in a form of smart card. Accordingly, the identifying device may be connected with the mobile communication terminal 100 through a port. The interface unit 170 is provided to receive data or power from an external device and transfer the received data or power to every element within the mobile communication terminal 100 or may be used to transfer data within the mobile communication terminal 100 to an external device.

When the mobile communication terminal 100 is connected with an external cradle, the interface unit 170 may serve as a conduit to allow power from the cradle to be supplied therethrough to the mobile communication terminal 100 or may serve as a conduit to allow various command signals inputted from the cradle to be transferred to the mobile communication terminal 100 therethrough. Various command signals or the power inputted from the cradle may operate as a signal for recognizing when the mobile terminal is properly mounted on the cradle.

The control unit 180 typically controls a general operation of the mobile communication terminal 100. For example, the control unit 180 performs a control and processing operation associated with a voice call, a data communication, a video phone call, and the like. In addition, the control unit 180 may include a multimedia module 181 for reproducing multimedia content. The multimedia module 181 may be provided within the control unit 180 or may be separately provided from the control unit 180.

The control unit 180 may perform a pattern recognition processing to recognize a handwriting or picture-drawing input performed on the touch screen as a character or image, respectively.

The power supply unit 190 receives external or internal power to supply the power required for an operation of each element under a control of the control unit 180.

The function of a component applied to the mobile communication terminal 100 may be implemented in a computer-readable medium using software, hardware, or any combination thereof. For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the control unit 180. For software implementation, the embodiments such as procedures or functions may be implemented together with separate software modules that allow performing of at least one function or operation. Software codes can be implemented by a software application written in any suitable programming language. Furthermore, the software codes may be stored in the memory 160 and executed by the control unit 180.

The speech recognition module 182 recognizes speech uttered by a user, and performs a relevant function based on the recognized voice signal.

A navigation session 300 applied to the mobile communication terminal 100 displays a travel path on data map.

Figure 2:
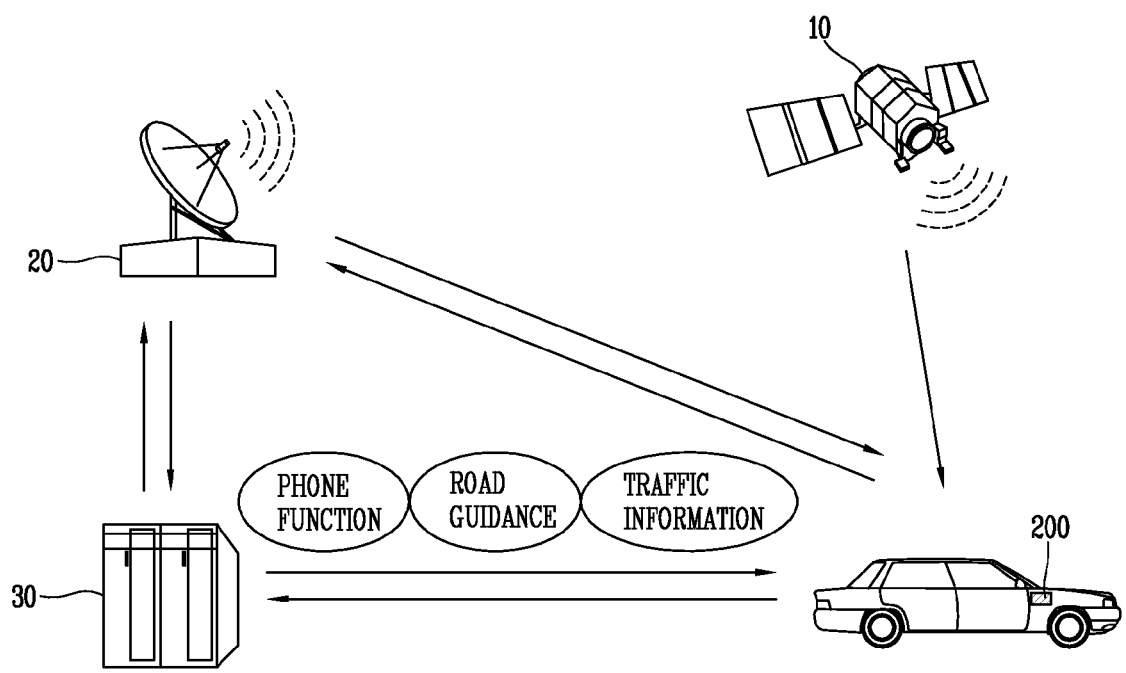
FIG. 2 is a block diagram showing a vehicle navigation system for illustrating embodiments of the present disclosure.

FIG. 2 is a block diagram showing a vehicle navigation system for illustrating embodiments of the present disclosure.

As shown in FIG. 2, the vehicle navigation system is configured with an information providing center 30 for providing traffic information and various data (e.g., programs, execution files, etc.), and a telematics terminal 200 that is mounted within a vehicle, receives traffic information via a remote wireless communication network 20 and/or short-range wireless communication network, and provides a road guidance service based on a GPS signal received via an artificial satellite 10 and the traffic information. Here, the communication network may further include wired/wireless communication networks such as local area network (LAN) and wide area network (WAN).

Various traffic information (e.g., road traffic information, interested area information) including traffic light information are collected via the communication network, and the collected information are processed according to a transport protocol expert group (TPEG) standard in the information providing center 30 (e.g., a server), to be sent to a broadcast station. Accordingly, the broadcast station inserts the traffic information including the traffic light information into a broadcast signal and broadcasts the broadcast signal to the vehicle 200.

The server may reconfigures a digital broadcast service through various routes connected to the communication network, for example, an operator input, wired/wireless Internet, transparent data channel (TDC) and multimedia object transport (MOC), and various traffic information collected from a different server or a probe car, into a traffic information format such as a format in conformity with the TPEG standard that is a standard for a traffic information service. The server then transmits the reconfigured information to the broadcast station.

The server may generate traffic information format of the TPEG standard including traffic light information, and transmit the generated traffic information to the broadcast station.

The broadcast station may insert the traffic information including the traffic light information which has been received from the server into a broadcast signal and wirelessly transmit the broadcast signal to a traffic information reception terminal mounted in the vehicle 200, for example, a navigation apparatus. The traffic information includes the traffic light information, and may additionally include information relating to various traffic conditions, which are required for operating the road, sea and air transportation, such as an accident, a road condition, traffic congestion, road construction, a road closure, a public traffic network delay, an air transportation holdup and the like.

The broadcast station receives the processed traffic information including the traffic light information from the server and transmits the received traffic information to the vehicle 200 through a digital signal in conformity with various digital broadcasting standards. In this case, the broadcast standards may include various types of digital broadcast standards, such as a Europe-oriented digital audio broadcasting (DAB) standard based on Eureca-147 [ETSI EN 300 401], terrestrial or satellite digital multimedia broadcasting (DMB) standard, a terrestrial digital video broadcasting (DVB-T) standard, a digital video broadcasting-handheld (DVB-H) standard, a media forward link only (MFLO) standard, and the like.

The broadcast station may transmit the traffic information including the traffic light information via a wired/wireless network such as wired/wireless Internet.

The vehicle 200 means every carrier, which can be implemented by using a mechanical and electronic device for the purpose of transporting people or objects, such as general passenger cars, buses, trains, ships, aircraft, and the like.

The vehicle 200 includes a traffic information reception terminal mounted therein, receives the traffic light information from the broadcast station using the mounted traffic information reception terminal, processes the traffic light information, and transfers the processed traffic light information to a user via graphic, text and/or audio.

Hereinafter, the configuration of the telematics terminal 200 for illustrating embodiments of the present disclosure will be described with reference to FIG. 3.

Figure 3:
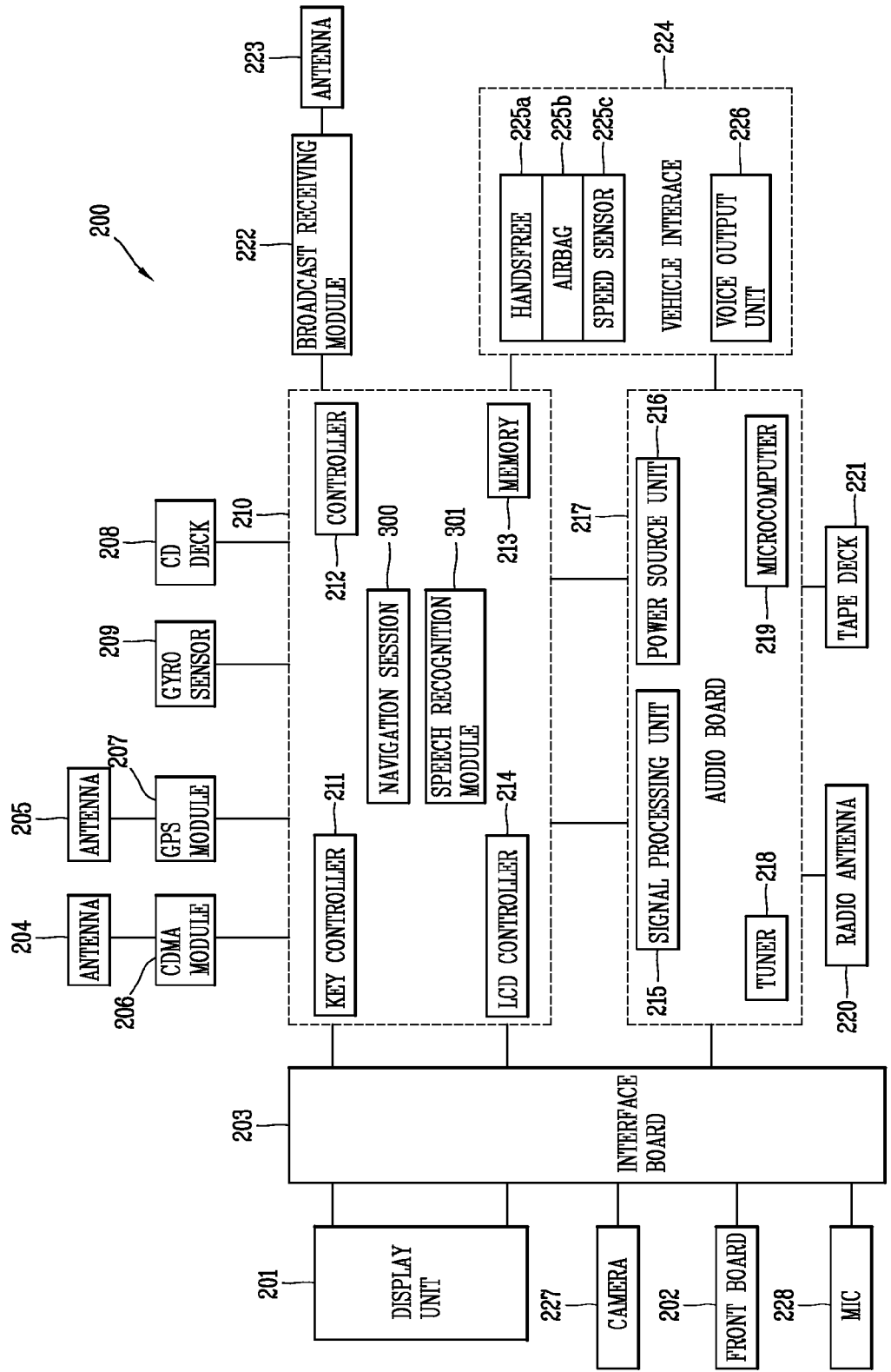
FIG. 3 is a block diagram showing a telematics terminal for illustrating embodiments of the present disclosure.

FIG. 3 is a block diagram showing the configuration of the telematics terminal 200 for illustrating embodiments of the present disclosure.

As shown in FIG. 3, the telematics terminal 200 is configured with a main board 210 including a control unit (e.g., a central processing unit (CPU)) 212 for overall control of the telematics terminal 200, a memory 213 for storing various information, a key control unit 211 for controlling various key signals, and an LCD control unit 214 for controlling an LCD.

The memory 213 stores map information (map data) for displaying road guidance information on a digital map. The memory 213 additionally stores a traffic information collecting control algorithm for inputting traffic information according to the situation of a road along which the vehicle currently travels, and information for controlling the algorithm.

The main board 210 may include a code division multiple access (CDMA) module 206 as a mobile terminal having a unique device number assigned and installed in the vehicle, a GPS module 207 for announcing a location of the vehicle, receiving a GPS signal for tracking a travel route from a start point to a destination, or transmitting traffic information collected by the user via a GPS signal, a compact disk (CD) deck 208 for reproducing a signal recorded in a CD, a gyro sensor 209, and the like. The CDMA module 206 and the GPS module 207 transmits/receives signals via antennas 204 and 205.

A broadcast receiving module 222 is connected with the main board 210 and receives a broadcast signal via an antenna 223. The main board 210 is connected via an interface board 203 with a display unit (i.e., an LCD) 201 controlled by the LCD control unit 214, a front board 202 controlled by the key control unit 211, and a camera 227 for capturing the interior and/or the exterior of the vehicle. The display unit 201 displays various video signals and character signals, and the front board 202 includes buttons for various key signal inputs and provides a key signal corresponding to a button selected by the user to the main board 210. The display unit 201 includes a proximity sensor of FIG. 2 and a touch sensor (touch screen).

The front board 202 may include a menu key for directly inputting traffic information. The menu key may be controlled by the key control unit 211.

An audio board 217 is connected to the main board 210 and processes various audio signals. The audio board 217 is configured with a microcomputer 219 for controlling the audio board 217, a tuner 218 for receiving a radio signal, a power supply unit 216 for supplying power to the microcomputer 219, and a signal processing unit 215 for processing various voice signals.

The audio board 217 is also configured with a radio antenna 220 for receiving a radio signal and a tape deck 221 for playing an audio tape. The audio board 217 may be further configured with an audio output unit (e.g., an amplifier) 226 for outputting a voice signal processed by the audio board 217.

The audio output unit (amplifier) 226 is connected to a vehicle interface 224. That is, the audio board 217 and the main board 210 are connected to the vehicle interface 224. A hands-free 225a for receiving a voice signal, an airbag 225b configured for the security of a passenger, a speed sensor 225c for detecting the speed of the vehicle and the like may be connected to the vehicle interface 224. The speed sensor 225c calculates a vehicle speed and provides the calculated vehicle speed information to the CPU 212.

The navigation session 300 applied to the telematics terminal 200 generates road guidance information based on the map data and current location information of the vehicle and provides the generated road guidance information to a user.

The display unit 201 may detect a proximity touch within a display window via the proximity sensor. For example, when a pointer (e.g., user's finger or stylus pen) gives a proximity touch, the display unit 201 may detect the position of the proximity touch and output position information corresponding to the detected position to the control unit 212.

A speech recognition device (or a speech recognition module) 301 recognizes speech pronounced by the user and performs a corresponding function according to the recognized speech signal.

The navigation session 300 applied to the telematics terminal 200 may display a travel route on map data. When the mobile communication terminal 100 is located within a preset distance from a blind spot included in the travel route, the navigation session 300 automatically forms wireless networks with terminals (e.g., vehicle navigation apparatuses) mounted in a nearby vehicle or mobile communication terminal carried around by a nearby pedestrian via radio communication (e.g., a short-range wireless communication network), to receive location information of the nearby vehicle from the terminal mounted in the nearby vehicle and receive location information of the nearby pedestrian from the mobile communication terminal carried around by the nearby pedestrian.

Figure 4:
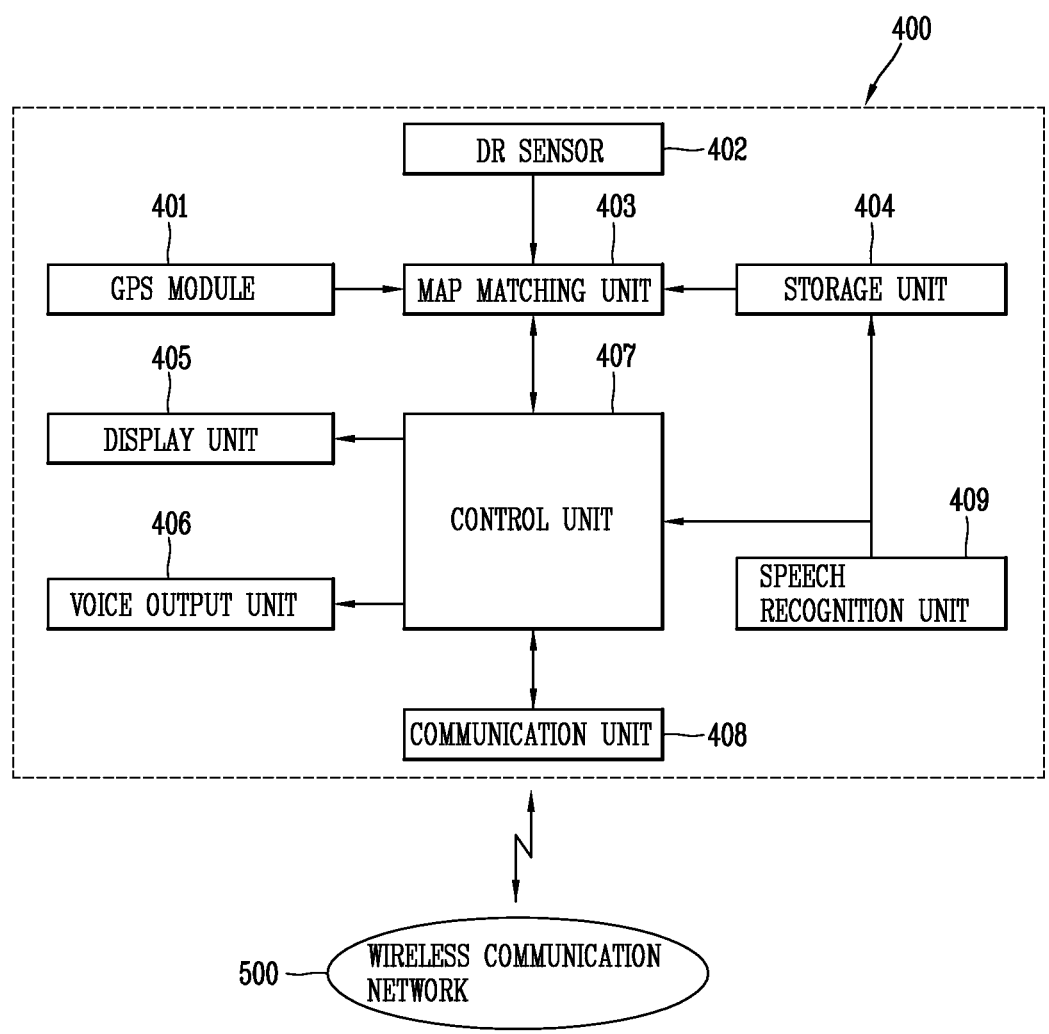
FIG. 4 is a block diagram showing a configuration of a navigation (vehicle navigation) apparatus for illustrating embodiments of the present disclosure.

FIG. 4 is a block diagram showing a configuration of a navigation (vehicle navigation) apparatus 400 for illustrating embodiments of the present disclosure.

The navigation (vehicle navigation) apparatus 400 is divided into an in-dash type and an on-dash type according to an installation form in the vehicle 200. The in-dash type navigation (vehicle navigation) apparatus is inserted into a predetermined space allocated within a dash board to be fixed thereto. The on-dash type navigation (vehicle navigation) apparatus is mounted on the dash board of the vehicle 200 or installed using a particular holder near the dash board. The on-dash type navigation apparatus is detachably attached, and thus can be separated from the vehicle 200 and carried around.

The navigation (vehicle navigation) apparatus 400 according to the embodiments of the present disclosure includes the in-dash type and the on-dash type navigation (vehicle navigation) apparatuses. In addition, the navigation (vehicle navigation) apparatus 400 includes any information processing device, which is capable of receiving and/or processing traffic information, such as various types of portable terminals which can execute a navigation function by interworking with a GPS receiver which receives navigation messages transmitted from GPS satellites within the vehicle 200.

As shown in FIG. 4, the navigation apparatus 400 is configured with a GPS module 401 for receiving a GPS signal received from a satellite and generating first vehicle location data of the navigation apparatus (regarded as the same location as the telematics terminal 200 or the mobile communication terminal 100) based on the received GPS signal; a dead-reckoning (DR) sensor 402 for generating second vehicle location data based upon a travel direction and the speed of a vehicle; a storage unit (or memory) 404 for storing map data and various information; a map matching unit 403 for generating an estimated vehicle location based upon the first vehicle location data and the second vehicle location data, matching the generated estimated vehicle location with a link (map matching link or map matching road) in the map data stored in the storage unit 404, and outputting the matched map information (map matched result); a communication unit 408 for receiving real-time traffic information from an information providing center and/or a nearby vehicle via a wireless communication network 500, receiving traffic light information, and performing call communication; a control unit 407 for generating road guidance information based upon the matched map information (map matching results); a display unit 405 for displaying both road guidance map (including information on a point of interest (POI)) included in the road guidance information and the traffic light information; and a voice output unit 406 for outputting road guide audio (voice) information (road guide voice message) included in the road guidance information and a voice signal corresponding to the traffic light information.

The navigation apparatus 400 may include a speech recognition device (or a speech recognition module) 409 that recognizes speech pronounced by a user.

The communication unit 408 may further include a hands-free having a Bluetooth module, and receive a broadcasting signal including traffic information in a TPEG format from the broadcast station via an antenna. The broadcast signal includes traffic information according to a TPEG service and a binary format for scene (BIFS) data service and supplementary information such as various supplementary data, as well as video and audio data in conformity with various standards, such as a terrestrial or satellite DMB standard, a DAB standard, a DVB-T standard, and the like. Also, the communication unit 408 tunes a signal band providing traffic information, demodulates the tuned signal, and output the same to a TPEG decoder (included in the control unit 407).

The TPEG decoder decodes the traffic information in the TPEG format, and provides various information, such as traffic light information included in the traffic information, to the control unit 407.

The road guidance information may include various information related to traveling, such as lane information, speed limit information, turn-by-turn information, traffic safety information, traffic guidance information, vehicle information, road search information and the like, as well as the map data.

The signal received via the GPS module 401 may be configured to provide the location information of a terminal to the navigation apparatus 400 using a wireless communication scheme proposed by Institute of Electrical and Electronics Engineers (IEEE). Examples of the wireless communication scheme may include 802.11, a standard for the wireless network for WLAN including wireless LAN, infrared communication and the like, 802.15, a standard for a wireless personal area network (PAN) including Bluetooth™, UWB, ZigBee and the like, 802.16, a standard for a wireless metropolitan area network (MAN) broadband wireless access (BWA) including a fixed wireless access (FWA) and the like, and 802.20, a standard for the mobile Internet with respect to a mobile broadband wireless access (MBWA)) including Wibro, WiMAX and the like.

The navigation apparatus 400 may further include an input unit. The input unit may allow a user to select a desired function or input information. Various devices, such as a keypad, a touch screen, a jog shuttle, a microphone and the like may be used as the input unit.

The map matching unit 403 may generate the estimated location of the vehicle based upon the first location data and the second location data, and read the map data corresponding to a travel route from the storage unit 404.

The map matching unit 403 matches the estimated location of the vehicle with a link (road) included in the map data, and outputs the matched map information (map matching results) to the control unit 407. For example, the map matching unit 403 generates an estimated location of the vehicle based on the first and second location data, matches the generated estimated location of the vehicle with links within the map data stored in the storage unit 404 according to the link order, and outputs the matched map information (map matching results) to the control unit 407. Further, the map matching unit 403 may output road attribute information, such as single lane road, double lane road, and the like, included in the matched map information (map matching results) to the control unit 407. The function of the map matching unit 403 may also be implemented in the control unit 407.

The storage unit 404 stores map data. In this state, the stored map data may include geographic coordinates (or longitude/latitude coordinates) representing latitude and longitude by a degree/minute/second (DMS) unit. Here, besides the geographic coordinates, the stored map data may also use universal transverse Mercator (UTM) coordinates, Universal Polar Stereographic (UPS) coordinates, transverse Mercator (TM) coordinates and the like.

The storage unit 404 also stores various information such as menu screen images, points of interest (hereinafter, referred to as 'POI'), function characteristics information based on a particular position of the map data, and the like.

The storage unit 404 also stores various user interfaces (UIs) and/or graphic user interfaces (GUIs).

The storage unit 404 additionally stores data, programs, and the like, which are required for operating the navigation apparatus 400.

The storage unit 404 stores destination information input by a user via the input unit. Here, the destination information may be a destination, or one of a departure (start) point and a destination.

The display unit 405 displays image information (or road guidance map) included in the road guidance information generated by the control unit 407. Also, the display unit 405 includes a touch sensor (touch screen) and a proximity sensor. Furthermore, the road guidance information may include various information associated with traveling (driving, running), such as lane information, speed limit information, turn-by-turn information, traffic safety information, traffic guidance information, vehicle information, road search information and the like, as well as the map data.

When displaying the image information, the display unit 405 may display various contents such as menu screens, road guidance information, and the like, using user interfaces and/or graphic user interfaces included in the storage unit 404. The contents displayed on the display unit 405 may include various text or image data (including map data or various information data), and menu screens including icons, list menus, combo boxes, and the like.

Further, the voice output unit 406 outputs voice information included in the road guidance information (or voice messages for road guidance information) generated by the control unit 407. Here, the voice output unit 406 may be an amplifier or a speaker.

The control unit 407 generates road guidance information based on the matched map information, and outputs the generated road guidance information to the display unit 405 and voice output unit 406. Here, the display unit 405 displays the road guidance information.

The control unit 407 receives real-time traffic information from the information providing center and/or terminals (vehicle navigation apparatus) mounted in neighboring vehicles so as to generate road guidance information.

The control unit 407 may be connected to a call center via the communication unit 408 to perform call communication or transmit or receive information between the navigation system 400 and the call center. Here, the communication unit 408 may further include a hands-free module having a Bluetooth function using a short-range wireless communication method.

When a user selects a POI search menu, the controller 407 searches for a POI which is located in a route from the current location to the destination, and displays the searched POI on the display unit 405. In this state, the control unit 407 may search for a POI (namely, a point at which the route does not need to be changed (researched), e.g., a POI positioned at left or right side of the traveling road) positioned on the route and/or a POI (namely, a point at which the route needs to be changed, e.g., a point at which the preset route needs to be changed in order to go through a nearby POI) located near the route, and display the searched POI on the display unit 405.

Generally, when speech is recognized within a vehicle, a user starts speech recognition by operating a steering wheel control (SWC) button for a vehicle in order to the start of the speech recognition. Therefore, a vehicle accident may occur due to driving carelessness or the like according to the manipulation of the SWC button during vehicle driving.

Hereinafter, a speech recognition apparatus and method capable of accurately recognizing the speech of a driver (user) getting on a vehicle in an easy and convenient manner without the driver (user) having to operate a speech recognition start button or the like.

Figure 5:
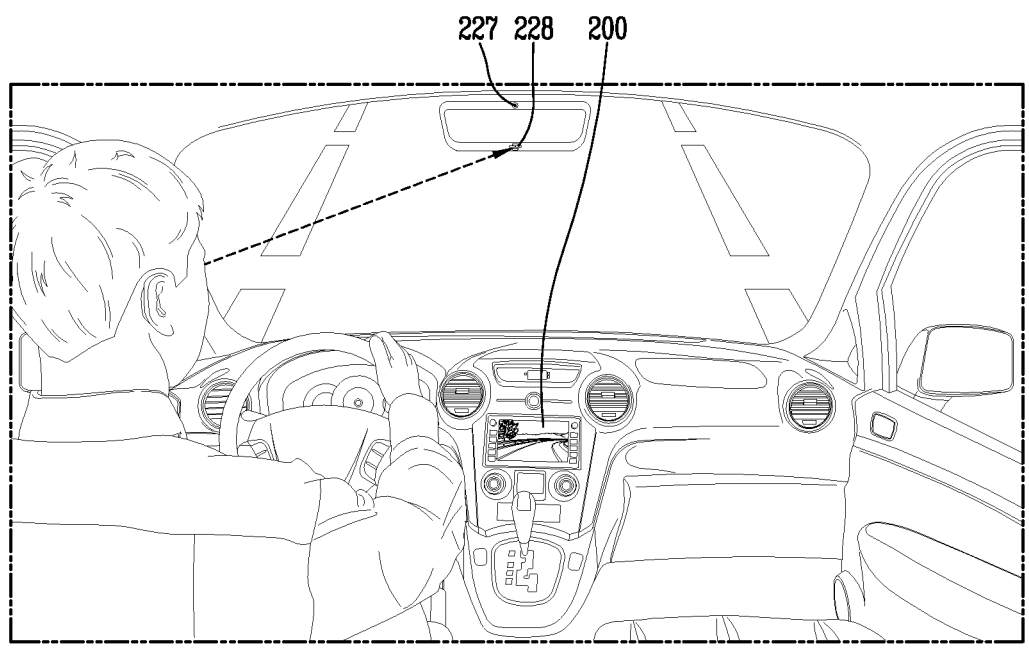
FIG. 5 an exemplary diagram showing a terminal to which a speech recognition apparatus is applied according to embodiments of the present disclosure.

FIG. 5 an exemplary diagram showing a terminal to which a speech recognition apparatus is applied according to embodiments of the present disclosure.

As shown in FIG. 5, the terminal may be the telematics terminal (or a head unit) 200 mounted in a vehicle. The camera 227 included in the telematics terminal 200 may be installed in a top end of a rear mirror of the vehicle, and a microphone (MIC) 228 may be installed in a bottom end of the rear mirror. The camera 227 and the MIC 228 may be installed in not only the rear mirror but also a dash board of the vehicle. Alternatively, the camera 227 and the MIC 228 may be installed in the telematics terminal 200.

The navigation apparatus 400 or the mobile communication terminal 100 may be used rather than the telematics terminal 200. A rear seat entertainment system (RSE), a cellular phone, a smart phone, a notebook computer, a terminal for digital broadcasting, a personal digital assistants (PDA), a portable multimedia player (PMP), a tablet personal computer (PC), or the like may be used rather than the mobile communication terminal 100. Hereinafter, the speech recognition apparatus applied to the telematics terminal 200 will be described as an example.

Figure 6:
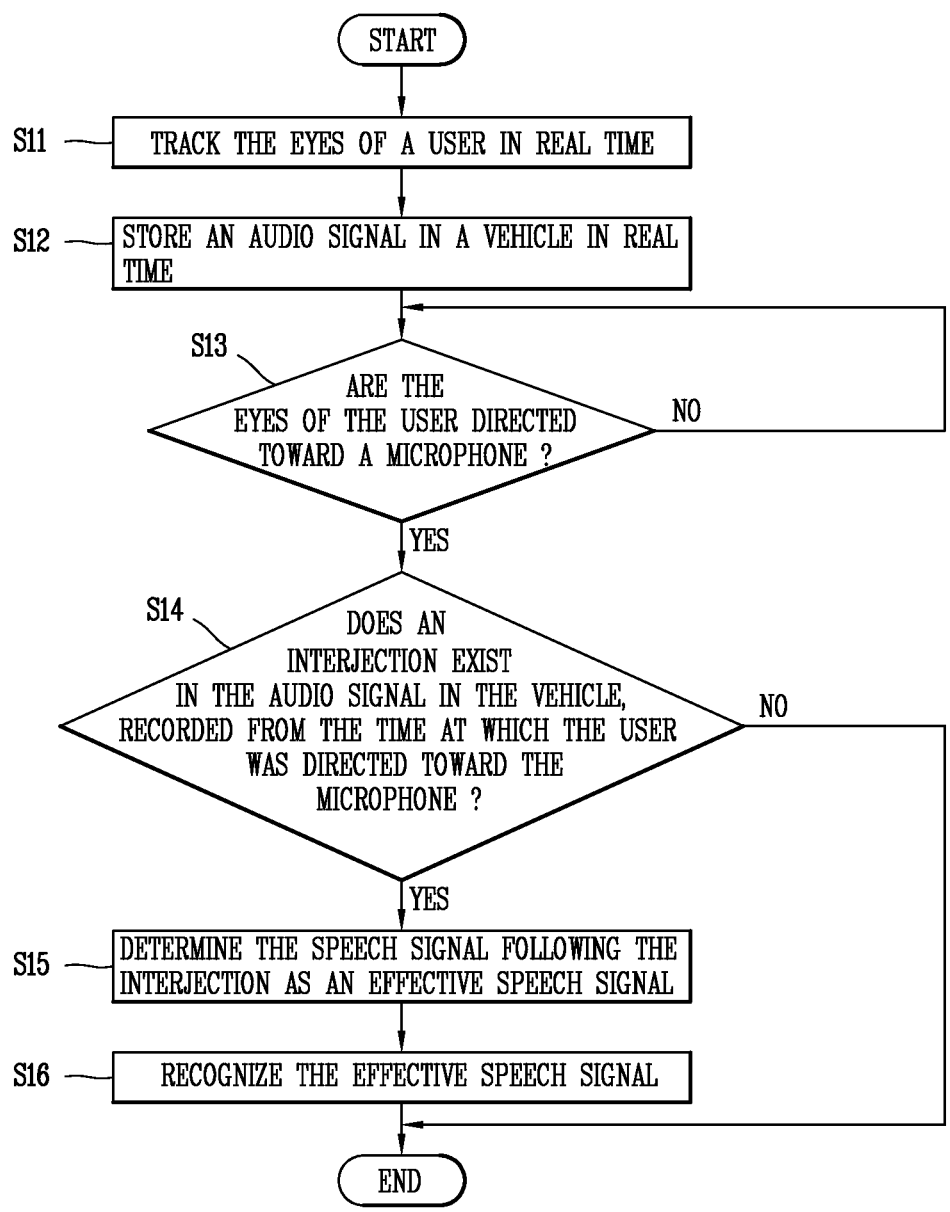
FIG. 6 is a flowchart illustrating a speech recognition method according to an embodiment of the present disclosure.

FIG. 6 is a flowchart illustrating a speech recognition method according to an embodiment of the present disclosure.

First, the control unit 212 receives a user image received in real time through the camera 227, and tracks the sight (eyes) of a user in real time from the user image (S11). For example, the control unit 212 tracks the sight (eyes) of the user through a general eye tracking technique.

The memory 213 stores an audio signal in a vehicle in real time (S12). For example, the memory 213 stores, in real time, the audio signal in the vehicle for only a preset time (e.g., 5 to 10 seconds). The memory 213, the control unit 212, the speech recognition module (speech recognition unit) 301 and the camera 227 may be time-synchronized with one another. The memory 213 may be a ring buffer.

The control unit 212 determines whether a preset user gesture is detected from the user image photographed through the camera 227. For example, the control unit 212 determines (decides) whether the eyes of the user are directed toward the MIC 228 (S13). When assuming that the camera 227 and the MIC 228 are installed at positions (e.g., a rear mirror of the vehicle) equal or similar to each other, the control unit 212 may determine that, if the eyes of the user are directed toward the camera 227, the eyes of the user is directed toward the MIC 228.

The control unit 212 may determine that, in addition to the user gesture (user movement) where the eyes of the user are directed toward the MIC 228, the user takes a preset user gesture when an arm or hand of the user moves near the face or mouth of the user.

If the eyes of the user are directed toward the MIC 228, the controller 212 operates the speech recognition module 301, and determines whether an interjection (e.g., "Um," "Ah" or the like) exists in the audio signal in the vehicle, recorded in the memory 213 from the time at which the user was directed toward the MIC 228 (S14). That is, the control unit 212 determines, as a start point of speech recognition, a nonlexical word such as an interjection habitually uttered when the speech of the user is started. Here, the control unit 212 and the speech recognition module 301 may be configured in a single body, and the single body may be called a speech control and recognition unit.

Figure 7:
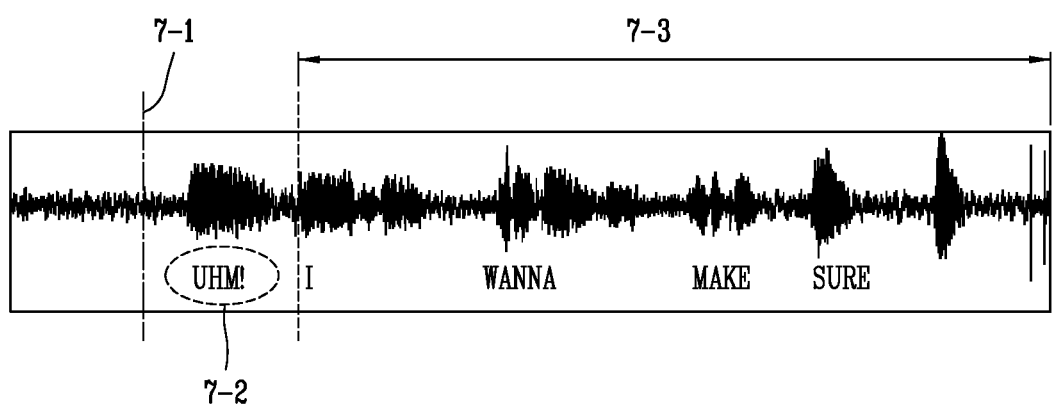
FIG. 7 is an exemplary diagram illustrating a method of determining an effective speech signal according to an embodiment of the present disclosure.

FIG. 7 is an exemplary diagram illustrating a method of determining an effective speech signal according to an embodiment of the present disclosure.

As shown in FIG. 7, if the eyes of the user is directed toward the MIC 228, the control unit 212 operates the speech recognition module 301, recognizes the audio signal in the vehicle, recorded in the memory 213, through speech recognition module 301 during a preset time (e.g., within 5 minutes) from a point of time (7-1) at which the user is directed toward the MIC, and detects a preset interjection 7-2 from the recognized audio signal.

If the preset interjection 7-2 is detected from the recognized audio signal, the control unit 212 determines, as an effective speech signal, a speech signal 7-3 following the detected interjection (S15), and recognizes the effective speech signal 7-3 through the speech recognition module 301 (S16). The speech recognition module 301 operates according to a control signal of the control unit 212, and receives a speech signal uttered by a user. That is, the speech recognition module 301 does not operate in real time but operates based on a control signal generated by the control unit 212 when the eyes of the user are directed toward the MIC 228, so that the driver (user) getting on the vehicle can receive and recognize user speech in easy and convenient manner without operating a speech recognition start button.

If the preset interjection is not detected from the recognized audio signal, the control unit 212 turns off the speech recognition module 301, thereby finishing the speech recognition operation.

The speech recognition module 301 compares the speech signal uttered by the user with a predetermined speech model, and determines the speech signal uttered by the user as the speech of the user according to the compared result. For example, the speech recognition module 301 compares a user speech signal with predetermined speech models that provide confidence scores representing a degree of similarity between input speech and a plurality of speech models, and allows the user speech signal as speech when the user speech signal corresponds to confidence scores higher than a threshold value according to the compared result.

On the other hand, when the user speech signal corresponds to confidence scores lower than the threshold value as the result obtained by comparing the predetermined models with the user speech signal, the speech recognition module 301 determines that the user speech signal is non-speech, and rejects the user speech signal. Then, the speech recognition module 301 re-induces speech recognition by providing a preset guidance message (e.g., "Please, speak more slowly"). When assuming that the range of the confidence scores is set from 0 to 100, the speech recognition module 301 may allow the user speech when the confidence score of the user speech signal is 90 to 100, and may reject the user speech when the confidence score of the user speech signal is less than 90. Here, the method of recognizing the user speech using the confidence score is also disclosed in U.S. Pat. No. 6,735,562.

The speech recognition module 301 determines whether the allowed user speech is a word or sentence. For example, if a pause generated between words exists in the allowed user speech when the user utters a sentence, the speech recognition module 301 determines that the allowed user speech is a sentence. On the other hand, if a pause generated between words does not exist in the allowed user speech when the user utters a sentence, the speech recognition module 301 determines that the allowed user speech is a word.

The control unit 212 controls a preset function corresponding to the word or sentence determined by the speech recognition module 301. The technique for controlling the preset function corresponding to the recognized word or sentence is a previously known technique, and therefore, its detailed description will be omitted.

When the user performs a telephone call through the hands-free 225a, the control unit 212 may not perform the speech recognition operation. For example, the control unit 212 may not perform the speech recognition operation while the hands-free 225a is operating.

Thus, in the speech recognition apparatus and method according to the embodiment of the present disclosure, if a nonlexical word (e.g., an interjection) is detected from a speech signal input from the point of time at which the eyes of the driver (user) are directed toward the MIC, the speech signal following the detected nonlexical word is automatically recognized as an effective speech signal, so that the driver (user) getting on the vehicle can accurately recognize the speech of the user in an easy and convenient manner without operating the speech recognition start button.

Figure 8:
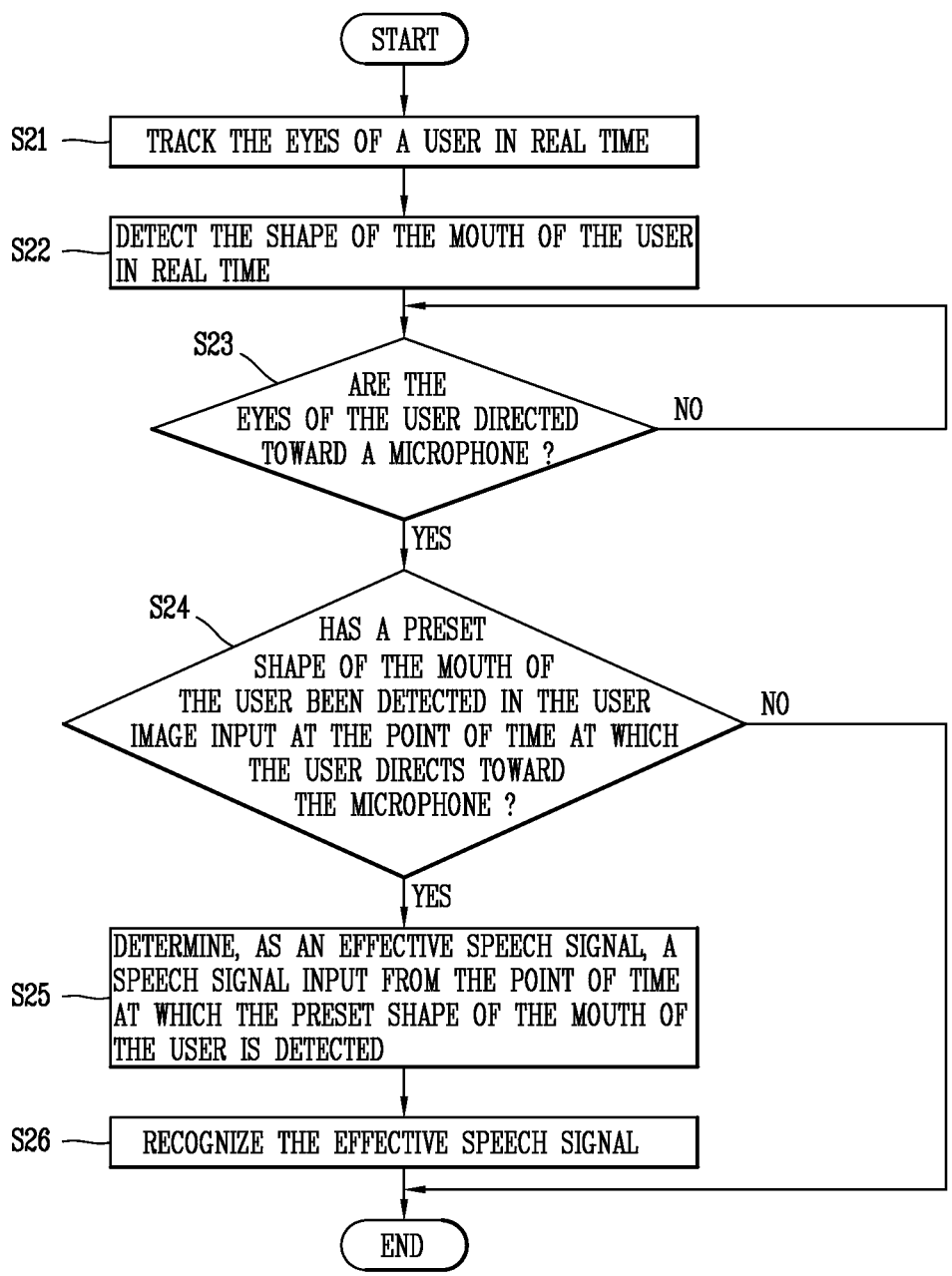
FIG. 8 is a flowchart illustrating a speech recognition method according to another embodiment of the present disclosure.

FIG. 8 is a flowchart illustrating a speech recognition method according to another embodiment of the present disclosure.

First, the control unit 212 receives a user image received in real time through the camera 227, and tracks the sight (eyes) of a user in real time from the user image (S11). For example, the control unit 212 tracks the sight (eyes) of the user through a general eye tracking technique.

The control unit 212 detects the shape of the mouth of the user in real time from the user image received in real time through the camera 227 (S22). For example, the control unit 212 detects whether the mouth of the user moves or is in a state in which the mouth of the user is closed (e.g., a state in which the mouth of the user is shut) based on the shape of the mouth of the user, detected in real time through the camera 227. The user image received in real time through the camera 227 may be stored in the memory 213. The memory 213, the control unit 212, the speech recognition module (speech recognition unit) 301 and the camera 227 may be time-synchronized with one another.

The control unit 212 determines (decides) whether the eyes of the user are directed toward the MIC 228 (S23). When assuming that the camera 227 and the MIC 228 are installed at positions (e.g., a rear mirror of the vehicle) equal or similar to each other, the control unit 212 may determine that, if the eyes of the user are directed toward the camera 227, the eyes of the user is directed toward the MIC 228.

If the eyes of the user are directed toward the camera 227, the control unit 212 operates the speech recognition module 301, and determines whether a preset shape of the mouth of the user (e.g., a shape (image) in which the mouth of the user moves or a shape (image) in which the mouth of the user is opened) is detected from the user image input from the point of time at which the user directs toward the MIC 228 (S24). That is, the control unit 212 determines, as a start point of speech recognition, the point of time at which the user opens the mouth while watching the MIC 228.

If a preset shape of the mouth of the user (e.g., a shape (image) in which the mouth of the user moves or a shape (image) in which the mouth of the user is opened) is detected from the user image input from the point of time at which the user directs toward the MIC 228, the control unit 212 determines, as an effective speech signal, a speech signal input from the point of time at which the preset shape of the mouth of the user is detected (S25), and recognizes the effective speech signal through the speech recognition module 301.

Figure 9:
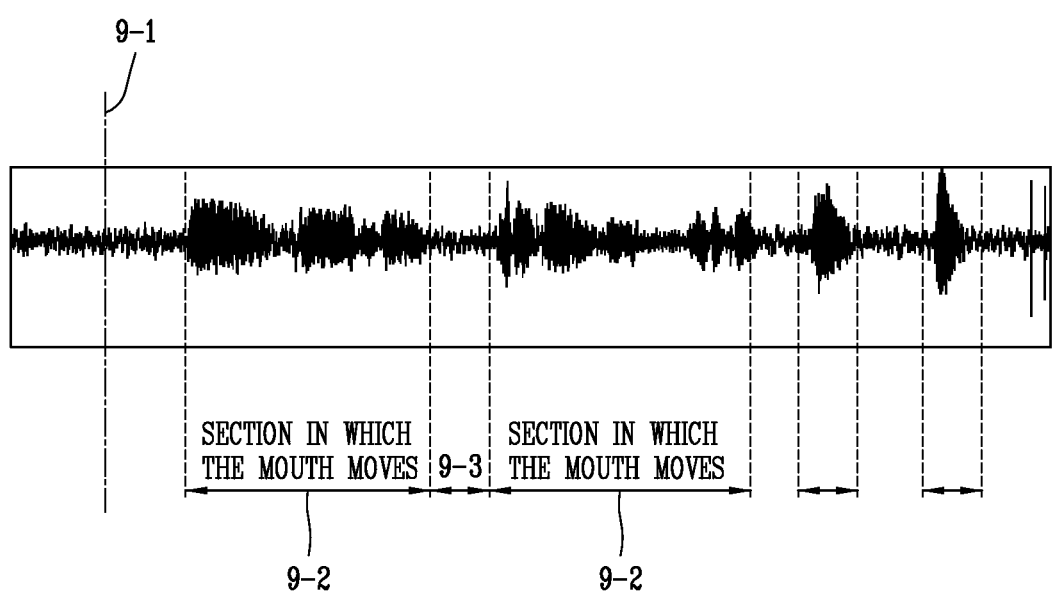
FIG. 9 is an exemplary diagram illustrating a method of determining an effective speech signal according to another embodiment of the present disclosure.

FIG. 9 is an exemplary diagram illustrating a method of determining an effective speech signal according to another embodiment of the present disclosure.

As shown in FIG. 9, if a preset shape of the mouth of the user (e.g., an image in which the mouth of the user moves) is detected from an user image input from a point of time (9-1) at which the eyes of the user are directed toward the MIC 228, the control unit 212 determines, as a speech section (9-2), only a speech signal corresponding to the preset shape of the mouth of the user (e.g., the image in which the mouth of the user moves) in the speech signal input from the point of time at which the preset shape of the mouth of the user is detected, and determines, as a non-speech section (9-3), the other speech signal except the speech signal corresponding to the preset shape of the mouth of the user (e.g., the image in which the mouth of the user moves) in the speech signal input from the point of time at which the preset shape of the mouth of the user is detected. The speech recognition module 301 does not recognize a speech signal corresponding to the non-speech section but recognizes only a speech signal corresponding to the determined speech section, and outputs the recognized speech signal (e.g., a word or sentence) to the control unit 212.

The speech recognition module 301 operates according to a control signal of the control unit 212, and receives a speech signal uttered by a user. That is, the speech recognition module 301 does not operate in real time but operates based on a control signal generated by the control unit 212 when the eyes of the user are directed toward the MIC 228, so that the driver (user) getting on the vehicle can receive and recognize user speech in easy and convenient manner without operating a speech recognition start button.

If the preset shape of the mouth of the user (e.g., the image in which the mouth of the user moves or the image in which the mouth of the user is opened) is not detected from the user image input from the point of time at which the user directs toward the MIC 228, the control unit 212 turns off the speech recognition module 301, thereby finishing the speech recognition operation.

The speech recognition module 301 compares the speech signal (effective speech signal corresponding to the speech section) uttered by the user with a predetermined speech model, and determines the speech signal uttered by the user as the speech of the user according to the compared result. For example, the speech recognition module 301 compares a user speech signal with predetermined speech models that provide confidence scores representing a degree of similarity between input speech and a plurality of speech models, and allows the user speech signal as speech when the user speech signal corresponds to confidence scores higher than a threshold value according to the compared result.

On the other hand, when the user speech signal corresponds to confidence scores lower than the threshold value as the result obtained by comparing the predetermined models with the user speech signal, the speech recognition module 301 determines that the user speech signal is non-speech, and rejects the user speech signal. Then, the speech recognition module 301 re-induces speech recognition by providing a preset guidance message (e.g., "Please, speak more slowly"). When assuming that the range of the confidence scores is set from 0 to 100, the speech recognition module 301 may allow the user speech when the confidence score of the user speech signal is 90 to 100, and may reject the user speech when the confidence score of the user speech signal is less than 90.

Thus, in the speech recognition apparatus and method according to the embodiment of the present disclosure, if a preset shape of the mouth of the user (e.g., an image in which the mouth of the user moves or an image in which the mouth of the user is opened) is detected from the user image input from the point of time at which the user directs toward the MIC, the speech signal input from the point of time at which the preset shape of the mouth of the user is detected is automatically recognized as an effective speech signal, so that the driver (user) getting on the vehicle can accurately recognize the speech of the user in an easy and convenient manner without operating the speech recognition start button.

In the speech recognition apparatus and method according to the embodiment of the present disclosure, if a preset shape of the mouth of the user (e.g., an image in which the mouth of the user moves) is detected from the user image input from the point of time at which the user directs toward the MIC, only a speech signal corresponding to the preset shape of the mouth of the user (e.g., the image in which the mouth of the user moves) in the speech signal input from the point of time at which the preset shape of the mouth of the user is detected is recognized as an effective speech signal, so that the user speech can be accurately recognized regardless of noises with the vehicle (e.g., noises of a wiper, sounds of a turn-signal light, sounds of a vehicle engine, etc.).

Although some embodiments of the present disclosure are described for illustrative purposes, it will be apparent to those skilled in the art that various modifications and changes can be made thereto within the scope of the invention without departing from the essential features of the invention. Accordingly, the aforementioned embodiments should be construed not to limit the technical spirit of the present disclosure but to be provided for illustrative purposes so that those skilled in the art can fully understand the spirit of the present disclosure. The scope of the present disclosure should not be limited to the aforementioned embodiments but defined by appended claims. The technical spirit within the scope substantially identical with the scope of the disclosure will be considered to fall in the scope of the present disclosure defined by the appended claims.

As described in detail above, in the speech recognition apparatus and method according to the embodiments of the present disclosure, if a nonlexical word (e.g., an interjection) is detected from a speech signal input from the point of time at which the eyes of the driver (user) are directed toward the MIC, the speech signal following the detected nonlexical word is automatically recognized as an effective speech signal, so that the driver (user) getting on the vehicle can accurately recognize the speech of the user in an easy and convenient manner without operating the speech recognition start button.

In the speech recognition apparatus and method according to the embodiments of the present disclosure, if a preset shape of the mouth of the user (e.g., an image in which the mouth of the user moves or an image in which the mouth of the user is opened) is detected from the user image input from the point of time at which the user directs toward the MIC, the speech signal input from the point of time at which the preset shape of the mouth of the user is detected is automatically recognized as an effective speech signal, so that the driver (user) getting on the vehicle can accurately recognize the speech of the user in an easy and convenient manner without operating the speech recognition start button.

In the speech recognition apparatus and method according to the embodiments of the present disclosure, if a preset shape of the mouth of the user (e.g., an image in which the mouth of the user moves) is detected from the user image input from the point of time at which the user directs toward the MIC, only a speech signal corresponding to the preset shape of the mouth of the user (e.g., the image in which the mouth of the user moves) in the speech signal input from the point of time at which the preset shape of the mouth of the user is detected is recognized as an effective speech signal, so that the user speech can be accurately recognized regardless of noises with the vehicle (e.g., noises of a wiper, sounds of a turn-signal light, sounds of a vehicle engine, etc.).

What is claimed is:

1. A speech recognition apparatus, comprising:
   a camera configured to capture a plurality of images of a user;
   a microphone;
   a control unit configured to:
      track at least one eye of the user based on the plurality of images of the user;
      determine a reference time at which the tracked at least one eye of the user is directed toward the microphone;
      determine whether a nonlexical word is detected in a first speech signal received via the microphone during a period of time beginning from the reference time at which the tracked at least one eye of the user is directed toward the microphone; and
      based on a determination that the nonlexical word is detected in the first speech signal during the period of time beginning from the reference time, determine a second speech signal received via the microphone subsequent to the detected nonlexical word; and
   a speech recognition unit configured to recognize a speech of the user from the second speech signal.

2. The speech recognition apparatus of claim 1, wherein the control unit is configured to determine whether the nonlexical word is detected in the first speech signal by determining whether an interjection is detected in the first speech signal.

3. The speech recognition apparatus of claim 1, wherein the control unit is further configured to activate the speech recognition unit based on a determination that the tracked at least one eye of the user is directed toward the microphone.

4. The speech recognition apparatus of claim 3, wherein the control unit is further configured to:
   based on a determination that the nonlexical word is not detected in the first speech signal, deactivate the speech recognition unit.

5. The speech recognition apparatus of claim 1, wherein:
   the camera and the microphone are provided in proximity to each other; and
   the control unit is further configured to determine that the tracked at least one eye of the user is directed toward the microphone by determining that the tracked at least one eye of the user is directed toward the camera.

6. The speech recognition apparatus of claim 1, wherein the control unit is further configured to track a shape of a mouth of the user based on the plurality of images of the user.

7. The speech recognition apparatus of claim 6, wherein the control unit is configured to track the shape of the mouth of the user by tracking at least one of a movement of the mouth of the user or an open state of the mouth of the user.

8. The speech recognition apparatus of claim 6, wherein the control unit is further configured to:
   determine a first tracked shape of the mouth that corresponds to the nonlexical word;
   determine whether the first tracked shape of the mouth is detected in the plurality of images of the user during the period of time beginning from the reference time at which the tracked at least one eye of the user is directed toward the microphone; and
   based on a determination that the first tracked shape of the mouth is detected in the plurality of images of the user during the period of time beginning from the reference time, determine the second speech signal received via the microphone subsequent to the detected first tracked shape of the mouth.

9. The speech recognition apparatus of claim 1, wherein the control unit is further configured to:
   determine, based on the plurality of images of the user, that one of an arm or a hand of the user moves near a face of the user; and
   based on the determination that the one of the arm or the hand of the user moves near the face of the user, activate the speech recognition unit.

10. A speech recognition method, comprising:
    capturing, via a camera, a plurality of images of a user;
    tracking at least one eye of the user based on the plurality of images of the user;
    determining a reference time at which the tracked at least one eye of the user is directed toward a microphone;
    determining whether a nonlexical word is detected in a first speech signal received via the microphone during a period of time beginning from the reference time at which the tracked at least one eye of the user is directed toward the microphone;
    based on a determination that the nonlexical word is detected in the first speech signal during the period of time beginning from the reference time, determine a second speech signal received via the microphone subsequent to the detected nonlexical word; and
    recognizing, via a speech recognition unit, a speech of the user from the second speech signal.

11. The speech recognition method of claim 10, wherein determining whether the nonlexical word is detected in the first speech signal comprises determining whether an interjection is detected in the first speech signal.

12. The speech recognition method of claim 10, further comprising:
    activating the speech recognition unit based on a determination that the tracked at least one eye of the user is directed toward the microphone.

13. The speech recognition method of claim 12, further comprising:
    deactivating the speech recognition unit based on a determination that the nonlexical word is not detected in the first speech signal after a predetermined period of time subsequent to a most recent activation of the speech recognition unit.

14. The speech recognition method of claim 10, further comprising determining that the tracked at least one eye of the user is directed toward the microphone by determining that the tracked at least one eye of the user is directed toward the camera.

15. The speech recognition method of claim 10, further comprising: tracking a shape of a mouth of the user based on the plurality of images of the user.

16. The speech recognition method of claim 15, wherein tracking the shape of the mouth of the user comprises tracking at least one of a movement of the mouth of the user or an open state of the mouth of the user.

17. The speech recognition method of claim 15, further comprising:
- determining a first tracked shape of the mouth that corresponds to the nonlexical word;
- determining whether the first tracked shape of the mouth is detected in the plurality of images of the user during the period of time beginning from the reference time at which the tracked at least one eye of the user is directed toward the microphone; and
- based on a determination that the first tracked shape of the mouth is detected in the plurality of images of the user during the period of time beginning from the reference time, determining the second speech signal received via the microphone subsequent to the detected first tracked shape of the mouth.

18. The speech recognition method of claim 10, further comprising:
- determining, based on the plurality of images of the user, that one of an arm or a hand of the user moves near a face of the user; and
- based on the determination that the one of the arm or the hand of the user moves near the face of the user, activating the speech recognition unit.

* * * * *